United States Patent [19]

Schwimmer et al.

[11] Patent Number: 5,708,409

[45] Date of Patent: *Jan. 13, 1998

[54] VEHICLE SAFETY DEVICE

[75] Inventors: Martin Schwimmer, 1403 56th St., Brooklyn, N.Y. 11219-4618; Max Moskowitz, Flushing, N.Y.

[73] Assignee: Martin Schwimmer, Brooklyn, N.Y.

[*] Notice: The term of this patent shall not extend beyond the expiration date of Pat. No. 5,656,990.

[21] Appl. No.: 612,026

[22] Filed: Mar. 6, 1996

Related U.S. Application Data

[63] Continuation of Ser. No. 589,762, Jan. 22, 1996.

[51] Int. Cl.$^6$ ............................................. B60R 25/10
[52] U.S. Cl. ........................ 340/426; 340/540; 340/541; 340/542; 340/547
[58] Field of Search ................................ 340/426, 541, 340/542, 545, 547, 686, 540

[56] References Cited

U.S. PATENT DOCUMENTS

4,787,223  11/1988  Gotanda ............................. 70/264
4,983,947  1/1991  Mullen et al. ...................... 340/426

*Primary Examiner*—Thomas Mullen
*Assistant Examiner*—Julie B. Lieu
*Attorney, Agent, or Firm*—Ostrolenk, Faber, Gerb & Soffen, LLP

[57] ABSTRACT

An alerting device for an vehicle includes a sensor which senses the position of the movable locking knob of the vehicle and provides a switch output to a circuit which produces an alerting sound when the door locking knob has been opened. In one form thereof, the door locking knob is replaced with a structure which movably supports a magnet which moves between a position which is near a magnet sensor and a position where it is away from the magnet sensors. When the door locking knob is moved to the open position, the magnetic sensor senses its condition and causes the circuit to output an audible alert.

18 Claims, 6 Drawing Sheets

VEHICLE SAFETY DEVICE

RELATED APPLICATION

This is a continuation application of U.S. patent application Ser. No. 08/589,762, which was filed on Jan. 22, 1996.

BACKGROUND OF THE INVENTION

The present invention relates to safety devices for vehicles and is, more particularly, directed to a device that alerts a driver to the fact that children and/or other car passengers have unlocked the door locking knob of the vehicle.

Safety is a major consideration in the operation of vehicles. Of particular importance to parents, and to drivers generally, is the fear that children and other passengers may unlock and open the doors during travel, which could result in a terrible tragedy. The major aim of the present invention is to alert the vehicle driver to the fact that the door locking knob has been opened.

The present invention is further directed to a device which senses the placement of a human limb, such as a hand, head, etc. in or through the car window or other orifice, e.g. sunroof, so that the driver may take appropriate action.

SUMMARY OF THE INVENTION

It is an object of the present invention to provide a device which alerts a driver to the fact that a car door locking knob has been unlocked.

A further object of the present invention is to provide a car door knob locking device which is simple in construction and easy to use and install, even by a person having minimal or no technical abilities.

Yet another object of the present invention is to provide an alerting device which can be sold in the vehicle accessories after market, so that the same may be purchased by the general public for self installation in their vehicles.

The present invention also aims to provide a device of the aforementioned type which can be supplied as a kit containing a plurality of building blocks, from which the ultimate users can select and assemble the parts needed to fabricate an alerting system that is operable with the user's particular vehicle model.

In accordance with the present invention, the foregoing and other objects are realized by kits containing a plurality of building blocks which can be interlinked with one another in a variety of configurations to fit different vehicle models. In all cases, these building blocks can be combined to produce a device which is capable of being attached to or in proximity of or replacing the door locking knob, and which operates in a manner which senses the unlocked condition of the door knob and produces a switch output which controls a sound producing element to produce an audible alert.

In accordance with one embodiment of the invention, these building blocks are made of various parts which can be interfitted with one another in a manner generally similar to the manner in which building blocks used in the game of Lego® and other similar games are combined. These building blocks include a screw-on door lock knob part which is designed to replace the original knob and to be screwed upon the metal shaft to which the conventional door locking knob is normally screwed. Another block is a cap designed to be removably fitted over the knob part, the cap being removably held for a purpose explained further on. Further included is a corner block which can be linked to the cap and which in turn supports a joining block. That joining block has connected to it, in a downwardly depending manner, a level adjustor block which includes a projection which rides in a slot so that a magnet can be connected thereto in a manner which permits the vertical height thereof above the window sill to be adjusted. Vertically juxtaposed to the aforementioned level adjusting block is a starter or anchoring block which is affixed to the frame of the vehicle at the window sill. That block can support a pivoting block to which a magnetically activated sensor is attached in a manner such that the aforementioned magnet will selectively cause a switch closure in the sensor to change state depending on the proximity of the magnet to the sensor.

The effect of raising the door lock knob up and down is to move the magnet in close proximity to or away from the magnetic sensor, producing either a closed or open switch contact at a pair of output wires of the magnetic sensor. These wires are coupled to an electrical circuit.

The electrical circuit includes a buzzer, a battery and a manual main switch, all connected in a closed, series-connected circuit relationship with the pair of output wires from the magnetic sensor. Thus, when the contacts of the magnetic sensor are closed, the buzzer sounds to alert the driver that the door lock knob has been raised. The above circuit may include a potentiometer for controlling the loudness of the buzzer sound.

Other building blocks included with the kit provide coupling pieces for attachment to vehicle door locks which cannot be unscrewed, e.g. rectangular knobs, horizontally slidable knobs, rocker knobs and the like.

The present invention is also directed to a passive infrared (PIR) detector, which is designed to be positioned adjacent to the window(s) and/or sunroof and/or a locking element such as a knob or a handle of vehicles for the purpose of detecting the placement or movement of a human limb such as a hand or the like in or about the space of the open window or locking element. The PIR detects such movement and causes an audible sound to be generated to alert the driver to that condition.

The present invention also discloses in accordance with one embodiment thereof, a replacement car door locking knob which can be used to replace the existing knob. This replacement knob contains the components required for sensing that the knob has been raised and preferably includes the aforementioned electrical alerting circuit. This self-contained sensing device includes first and second pieces which are vertically moveable relative to one another in a manner which senses the knob position, and a circuit for alerting the driver that the door knob has been opened.

Other features and advantages of the present invention will become apparent from the following description of the invention which refers to the accompanying drawings.

BRIEF DESCRIPTION OF THE DRAWINGS

FIGS. 2a–2l show a kit of standard block elements which can be interlinked in various configurations to produce the present invention.

FIG. 10a is an enlargement of a portion of FIG. 10, with slight variations.

FIG. 10b is a view along lines 10b—10b in FIG. 10a.

FIG. 11 shows yet another embodiment of a concealed, internally mounted door locking knob sensor in accordance with the present invention.

DETAILED DESCRIPTION OF EMBODIMENTS OF THE INVENTION

Figure 1:
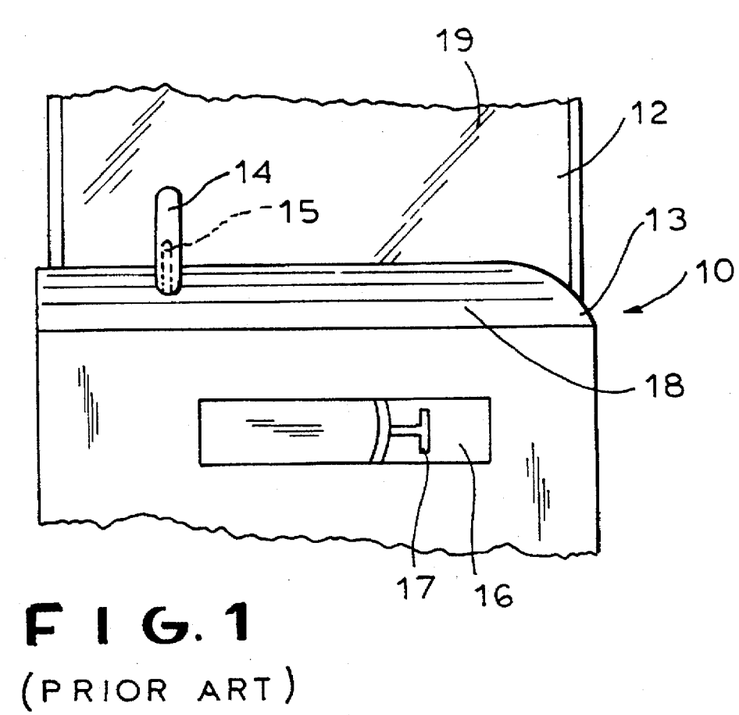
FIG. 1 is an outline of an vehicle window, showing the window sill and the conventional door locking knob.

For background and to provide the proper perspective, reference is made to prior art FIG. 1 which illustrates a typical vehicle door 10 which has a window 12, a window sill 13 and a door locking knob 14 which is typically screwed on a threaded shaft 15 (shown in dotted lines). A well or indentation 16 in the body of the door 10 typically houses a door handle 17. As is virtually universally known, the door 10 is locked when the knob 14 is pressed down and can be unlocked by raising the knob.

It is the aim of the present invention to provide a replacement for the knob 14 which incorporates the capability of audibly alerting the driver to the fact that the door knob has been raised. A further object of the present invention is to provide a passive (or active) infrared device which can be located near the window, for example on or about the position marked with reference numeral 18 or 19 (or at any other convenient place) for the purpose of similarly alerting the driver to the fact that someone is attempting to insert his or her hand through the open space of the window, sun roof, and the like.

With reference to FIG. 2a–2l, the present invention provides a kit containing a plurality of the illustrated building blocks (and other similar building blocks) which are specially designed to be easily interfitted with one another to produce the system of the present invention, which has to be assembled to fit different vehicle models. The manner in which these building blocks are assembled is explained further on.

Figure 2A:
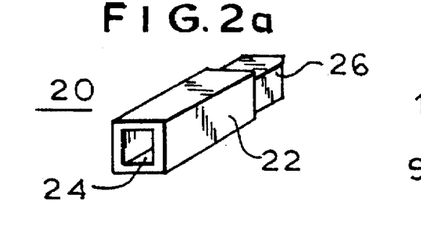

The device of FIG. 2a is a female/male regular block 20 which has a body 22 of square or rectangular cross-section with an opening 24 at one distal end thereof in which a male plug piece can be inserted. The part 20 includes a male plug 26 at the opposite distal end thereof as shown.

Figure 2B:
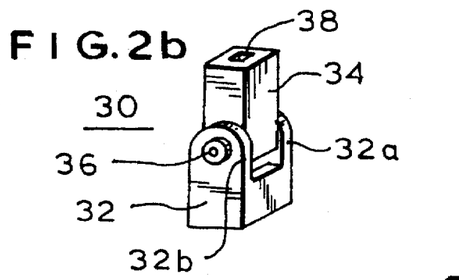

The pivot block 30 shown in FIG. 2b has a base portion 32 with spaced pivot arms 32a, 32b, between which is received a pivoting block 34 which is pivotally mounted between the arms 32a and 32b and held there by a threaded shaft 36. The pivoting block 34 has an opening 38. Alternatively, pivot block 34 can be sized and configured as a male plug which can be fitted into the opening 24 of the block 20 of FIG. 2a and other blocks.

Figure 2C:
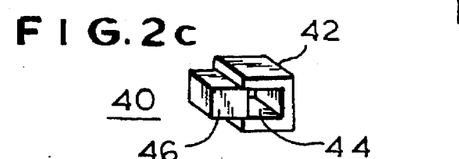

The corner block 40 of FIG. 2c has a body 42 with an opening 44 and a male projection 46. This part enables a 90° turn in connecting blocks to one another.

Figures 2D, 2E, 2F, 2L:
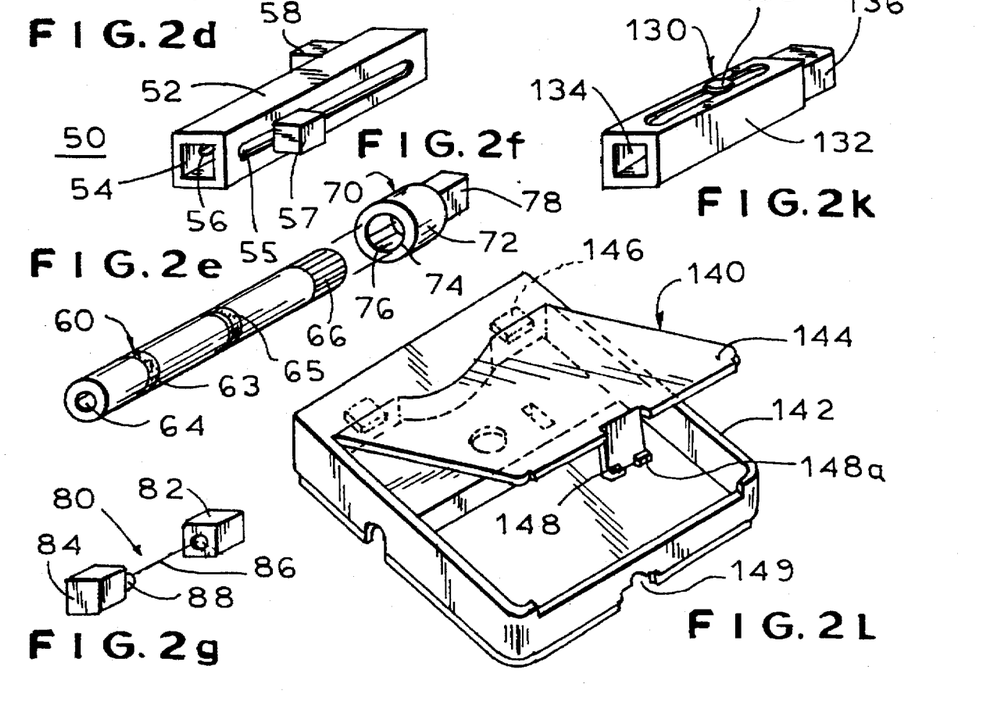

FIG. 2d illustrates a level adjustor 50 which has a hollow body 52, a through-going opening 54, a first slot 55 in one of the walls thereof and a second slot 56 in an opposite wall as shown. Magnet or a sensor holder blocks 57, 58 are slidingly supported in the slots 55, 56 as shown. These blocks 57, 58 are held in the slot by a screw (not shown) which has a head inside the block 52. By tightening the blocks onto the screw, the position of the blocks 57 and 58 can be fixed anywhere along the slot. Thus, one of the blocks (for example block 57) can be affixed to another block while the block 58 can be used to hold a magnet or a sensor at a height or at a distance relative to other parts which can be adjusted by adjusting either or both the positions of the blocks 57, 58.

The replacement for the conventional doorknob 14 of FIG. 1 is illustrated in FIG. 2e which shows a cylindrical doorknob replacement block 60 which has a body 62 with a threaded opening 64 which permits it to be threaded onto the shaft 15 (FIG. 1). This knob 60 further has a plurality of spaced, axially-oriented ribs 66 which permit the cap 70 of FIG. 2f to be located thereon without permitting relative rotation therebetween. To this end, the cap 70 which has a body 72 and an internal cylindrical opening 74 contains a plurality of grooves or ribs 76 complementary to those of the knob 60. The cap further includes a male mating block 78. The knob 60 may contain scorings 63 and 65 at several locations along the shaft of the body 62 thereof, so that a portion thereof can be broken off to accommodate knobs screws 15 of different lengths.

To couple or interlink parts which are not linearly aligned, FIG. 2g illustrates a double-jointed block 80 which has a first male (or female) plug 82 and a second similar plug 84. The connecting arm 86 engages the blocks at respective ball joints 88 or an equivalent structure. The disk 90 of FIG. 2h is designed to be attached to the body of the vehicle, for example at the window sill 13, by having its body 92 either glued to the sill or connected thereto by screws or similar means as indicated by reference numeral 94.

Figure 2H:
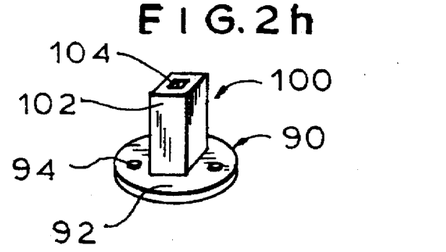

FIG. 2h also illustrates a joining block 100 which has a body 102 with openings 104 at the distal ends. This block permits the joining of two male plugs.

Figure 2I:
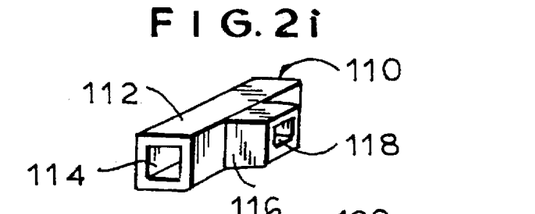

FIG. 2i illustrates a branching block 110 having a body 112, openings 114 at the distal ends thereof and a right angle extension 116 which has its own opening 118. Each of these extensions can be in the male or female form. (This applies to all of the openings and plugs describe herein.)

Figure 2J:
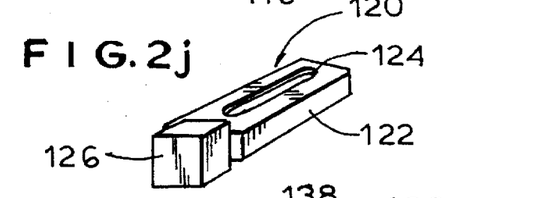

The sliding knob engaging block 120 of FIG. 2j has a body 122 with a slot 124 which can be fitted right over the sliding door lock button on certain vehicles. It has extending from it a block 126 which can be interconnected with other blocks so that when the sliding knob of the vehicle is moved left and right, such movement results in actuation of a sensor. A further useful block is illustrated in FIG. 2k which shows an extendable block which has a main body 132, a sliding channel 134 and an extendable piece 136 which is received within the opening 134 and is slidable therein. Thereby, the length of the extension 136 can be adjusted. Once a desired length of the block 136 has been set, its position can be fixed by tightening the lock nut 138.

For the purpose of housing electronic circuitry, the invention provides a housing block 140 illustrated in FIG. 2l which has an interior space in which electronic circuitry including switches, resistors, ICs, timers, a microprocessor, a buzzer, lights, batteries, etc. can be housed. The interior compartment can be closed with a door 144 which has hinges 146 received in a slot in the main housing and a latch 148. The latch 148 has projections 148a which snap into an opening 149 in the housing. This provides a child-resistant, tamper-proof housing for electronic circuitry that will be described further on.

Figure 3:
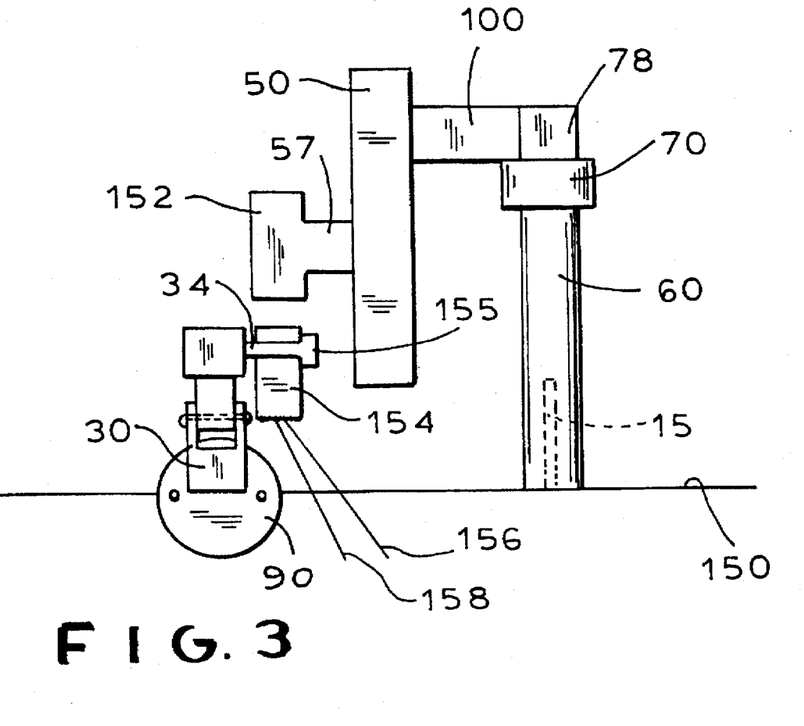
FIG. 3 illustrates a kit assembly of the building blocks, constituting a first embodiment of the present invention.

Reference is now made to FIG. 3, which illustrates a first embodiment, combining the blocks of FIGS. 2a–2l to construct an alerting system in accordance with the present invention. The reference line 150 designates the window sill 13 of FIG. 1, so as to illustrate that the knob 60 is screwed on the shaft 15, extending vertically above the sill 13. The cap 70 is slipped over the jagged distal end 66 (FIG. 2e) with the arm extension 78 oriented to enable block 40 and the block 100 to extend at a right angle and to the left, flush or parallel to the plane of the window 12.

The level adjustor block 50 is attached by means of its male plug 58 (FIG. 2d) to the block 100 while its other male plug 57 engages and supports a magnet 152 which may be glued or otherwise attached thereto. All of these parts can be securely interfitted or even glued together, except for the cap 70. This is in order to prevent car theft. Thus, any attempt to snag the blocks 50, 100, etc. will result in the cap 70 being disattached from the knob 60 without being able to raise and unlock the doorknob.

Figure 7:
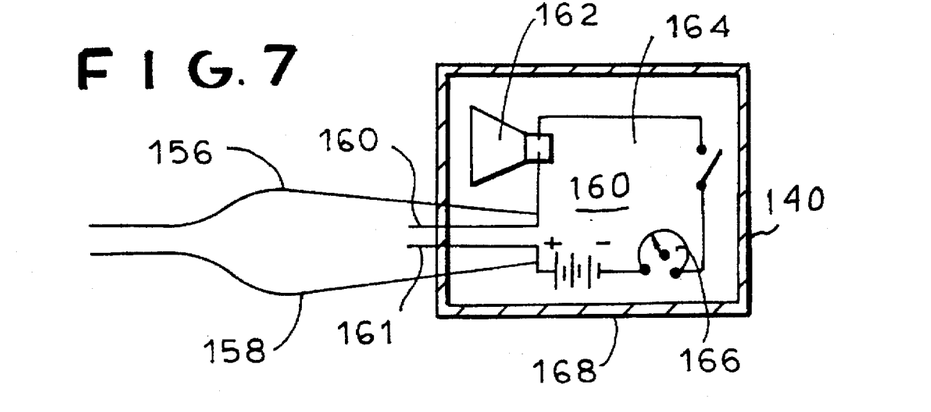
FIG. 7 is a circuit diagram of an electrical circuit for producing an audible alert.

Vertically juxtaposed to the magnet 152 is a magnetic sensor 154 which is attached by being either glued or by having a tie 156 secure the same to the pivotal block 34 of the pivot block 30 (FIG. 2b). The block 30 is secured to the starter block 90 which is in turn secured to the window sill 150 in any known manner. Note that the magnetic sensor 154 and the magnet 152 are vertically aligned. The magnetic sensor 154 and the magnet 152 can also be positioned perpendicularly or in parallel and the like. Thereby, when the magnet is moved away from the proximity of the magnetic sensor, a closed contact is produced between the wires 156, 158 which extend from the sensor 154. These switched output wires 156 and 158 may be connected to the electrical circuit 160 which is in the housing 140 (FIG. 7).

The circuit 160 (FIG. 7) includes a buzzer 162 which is connected in closed series-connected circuit relationship with a manual switch 164, a potentiometer 166 and a battery 168. Also included in this series-connected circuit are the wires 156 and 158 from the magnetic sensor 154. In operation, the switched output wires 156, 158 produce an open switch when the magnet 152 is located in close proximity to the sensor 154. However, when the knob 60 is raised (and with it the magnet 152), the wires 156, 158 produce a closed switch condition which closes the circuit 160, providing electrical current from the battery 168 to the buzzer 162 (assuming the manual switch 164 has been enabled by the owner of the vehicle). The loudness of the sound from the buzzer 162 is controlled by controlling the position of the potentiometer 166. The circuit can have several switch connection electrodes, including the electrodes 160, 162, so that one circuit 160 can handle the switched outputs of several magnetic sensors. If any door knob is raised, the buzzer will sound.

Figure 4:
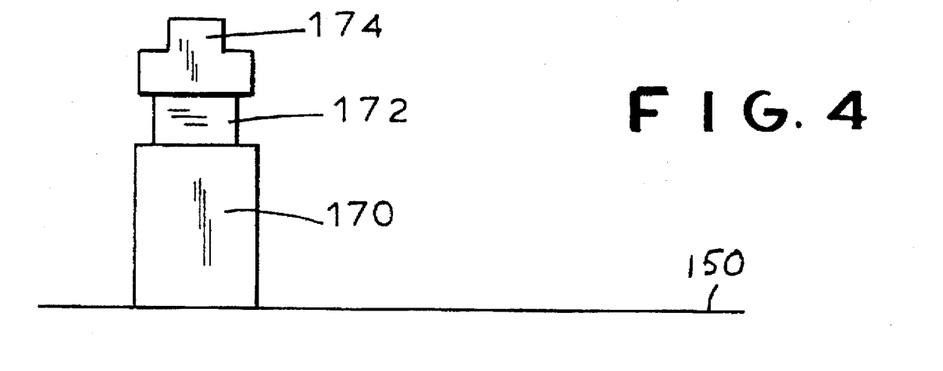
FIG. 4 shows several components adapted to fit vehicles with rectangular door locking knobs.

To accommodate a conventional rectangularly-shaped door knob 170 (FIG. 4), one of the extension blocks or a modified extension block 172 can be either glued or screwed onto the knob 170 and be provided with a cap 174. In other respects, the previous description applies.

Figure 5:
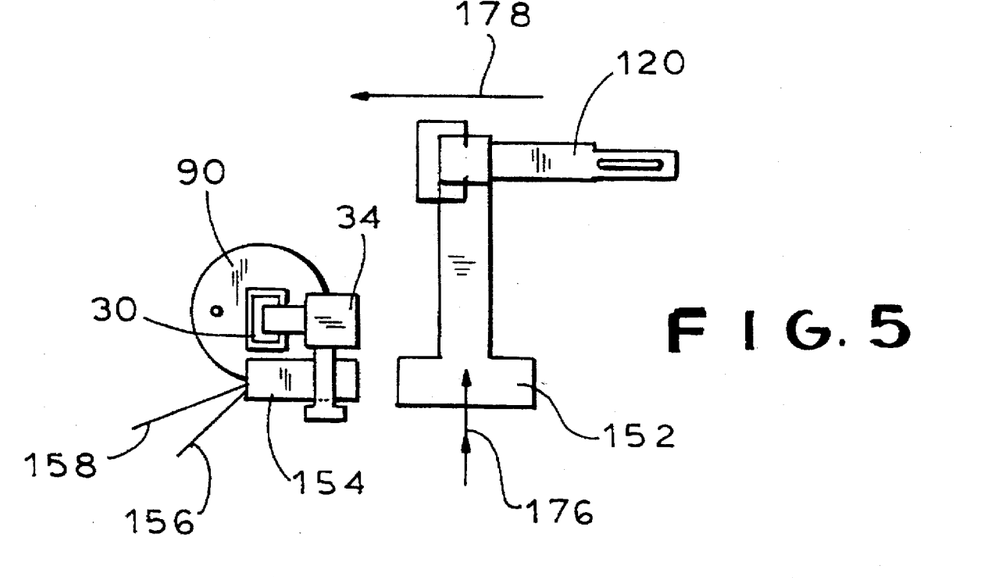
FIG. 5 is another assembly of the building block for a still further vehicle model.
Figure 6:
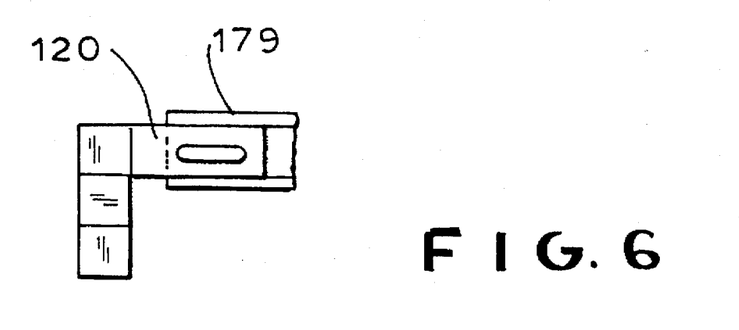
FIG. 6 shows yet another assembly of the building blocks for a still further vehicle model.

FIG. 5 shows that the magnetic sensor 154 and pivot block 30 can be mounted in a different orientation, in a manner whereby the sensor 154 can sense either vertical movement (see arrow 176) of the magnet 152 or horizontal movement thereof (see the arrows 178). FIG. 6 shows that the blocks of the present invention including the block 120 can be employed for the purpose of snagging and sensing the open position of a horizontally-movable, conventional door knob 179.

Figure 10:
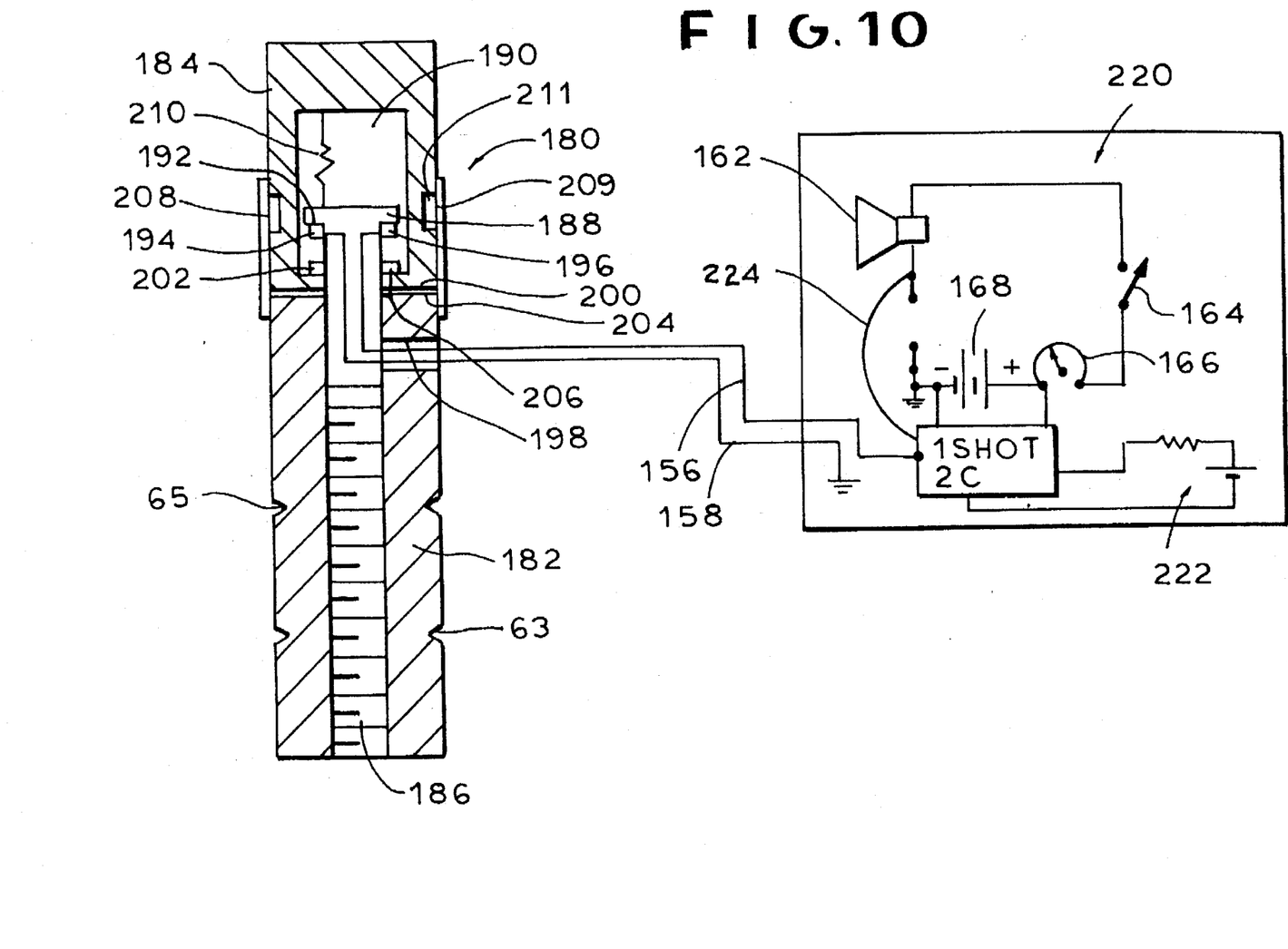
FIG. 10 shows a further embodiment of the present invention.
Figures 10A, 10B, 11:
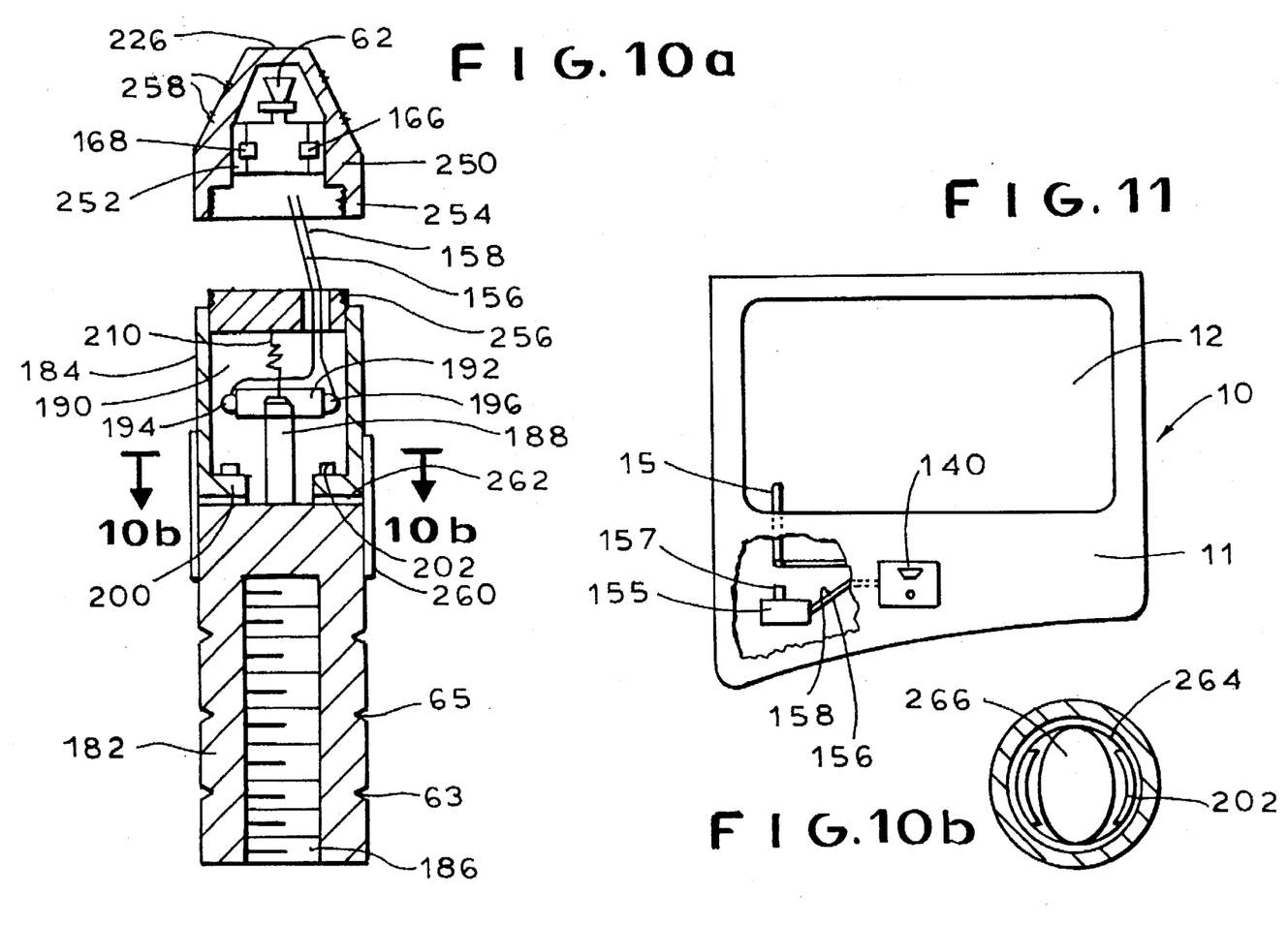

Another variant of the present invention which does not use the standard building blocks of FIGS. 2a–2k is illustrated in FIGS. 10, 10a and 10b. The invention comprises a screw-on two-part (or three-part) knob 180 which includes a screw-on portion 182 and a gripping portion 184. The screw-on portion has a threaded opening 186 which enables it to be screwed onto the door knob shaft 15, and score lines 63, 65 which serve the previously described function. The screw-on portion has an extension 188 which protrudes into a cavity 190 defined in the gripping portion 184. The extension 188 comprises a hat 192 which has formed thereon a first electrical contact 194 and a second electrical contact 196 to which the electrical wires 156 and 158 are connected. These wires protrude through an opening 198 in the body of the screw-on portion 182. The gripping portion 184 has an inwardly dented annular rim 200 on which there is formed a single contiguous electrical contact 202.

In operation, the gripping portion lower surface 204 normally rests atop the upper portion 206 of the screw-on portion. If desired, a soft spring 210 may be provided to bias the contacts 194, 196 and 202 away from one another. The screw on portion 182 may include a skirt 208 as shown, which is intended to foil car thief attempts to insert a tool between the elements 182 and 184. The skirt 208 has projections 209 which fit in vertical grooves 211 on the exterior of the gripping part 184, to prevent relative rotation between elements 182 and 184 while allowing a small amount vertical sliding. Stated differently, the element 184 normally rests atop element 182, due to gravity. In this condition, the contacts 194, 196 and 202 are spaced apart. However, when the gripping portion 184 is grasped and raised, the electrical contact 202 shorts the contacts 194 and 196, producing a closed switch output at the electrical wires 156, 158. This will cause the buzzer 162 (of FIG. 7) to sound off, producing the desired driver alert.

In the slightly modified circuit 220 of FIG. 10, the negative terminal of the battery 168 is grounded. One of the wires, e.g. 158 may also be grounded and the other may be connected to the input of a one-shot IC (for example, a monostable multivibrator with a schmitt trigger integrated circuit such as e.g. a 74121 part or like parts made in CMOS technology) which has a resistor and capacitor network 222 for producing a logical low output at line 224 for a duration which is determined by the time constant of the RC network 222. That time duration can be several seconds or even as long as a minute. That logical low output 224 is connected to one of the terminals of the buzzer 162 to produce a sound upon being activated.

FIG. 10a also illustrates the feasibility of employing a miniature buzzer and battery and housing the same within a cap portion 226 of the gripping portion 184 of the knob 180. All that is necessary is that the electrical contacts 194, 196 be connected in closed series-connected circuit relationship with the buzzer 162 and the battery 168.

The cap 226 defines an interior chamber 250 which holds a miniature circuit board 252 on which the buzzer 162, battery 168, potentiometer 166, etc. are located. The bottom thereof is open for accessibility and defines an annular extension 254 which is internally threaded so that the cap 226 can be screwed upon the gripping portion 184 at 256. The electrical wires 156 and 158 emerge from the gripping portion 184 so that they can be connected to the circuit board 252. The openings 258 in the cap 226 facilitate sound propagation from the buzzer 162. The battery may be a long lasting lithium battery and the circuit components should consume little electrical power (for example, by using CMOS parts), ensuring that the device could be used for one or more years without battery replacement.

FIGS. 10 and 10a have not been drawn to scale. Thus, the separation, i.e., gap, between the electrical contact 194, 196, on the one hand, and the contact 202 on the other hand, can be only a millimeter or several millimeters, so that when the gripping portion 184 is raised, the initial slippage relative to the lower portion 182 will be negligible, hardly noticeable. Further, a very thin plastic or similar elastic sleeve 260 can be placed over the portions 182, 184 as shown in FIG. 10a, to prevent (hopefully) a thief from inserting a snagging tool and grabbing the locking knob at the juncture between the elements 182 and 184. To this end, it may be advantageous to provide a minute fold 262 which will not interfere from the ability of the elements 182, 184 to separate when the knob is being raised. Indeed, the sleeve 260 can be made of highly stretchable plastic or rubber which will inherently provide that function. It will also render the spring 210 unnecessary.

With reference to FIG. 10b, the annular contact 202 can be made of two portions, a left portion and a right portion and a thin electrical connection 264 connecting the same. The shape of the opening 266 at the bottom of the gripping element 184 is such as to enable the hat 192 of the lower, screwed-on portion 182 to be inserted therethrough and then turned 90° to assume the orientation shown in FIG. 10a. Also possible (and perhaps preferable) is to provide the switch contacts on the rim 200 and have the wires 156, 158 extending therefrom. In this case, the hat 190 will have a single contiguous contact for shorting the wires 156, 158 when the gripping portion is raised. In this embodiment, it is not necessary to provide slack in the wires 156, 158 because the cap moves together with the gripping portion.

FIG. 11 shows that an electrical switch 155 can be located below the window 12 and behind the door panel 11. Here, the switch button 157 is located to be actuated by movement of the threaded shaft 15, so that as the lock knob is raised or lowered, an electrical circuit closes which causes the circuit 160 to sound off the alarm, based on the state of the electrical contacts provided via the wires 156 and 158.

General remarks/features associated with the building blocks and the alerting system of the present invention include the possibility that the starter block 90 is affixed to the vehicle surface by adhesive or screws and that it has a flexible or rigid base. Further, if it becomes necessary to prevent relative rotation between the cap 70 and the knob 60, a good malleable substance which can be introduced therebetween is, as an example, a single stick epoxy putty. It can be used when the contour of the knob is irregular, or to create special shape blocks. Further, the circuit housing 140 can be located in close proximity to the knob/sensing system, for example, near the base 90 on the window sill 13 of the vehicle. Alternatively, the electrical circuit and its housing 140 can be concealed, for example, behind the door panel. Or it can be located at a location remote from the reach of children/passengers. Further, the alerting element 162 can be located at or in the dashboard.

Figure 8:
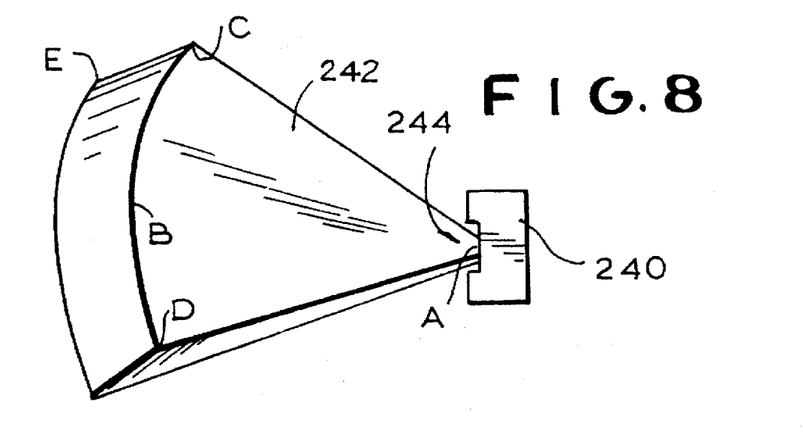
FIG. 8 shows a passive infrared (PIR) detector system for sensing human limb movements through and adjacent an vehicle window.

Reference is now made to FIG. 8, which depicts a further embodiment of the invention which uses a passive infrared (PIR) detector to protect a vehicle opening, e.g. a window or sunroof, etc. Such passive infrared monitors are widely known in the art and have been employed to detect heat (including the heat of a human body) as well as motion. The detector 240 monitors a generally wedge shaped space 242 which in accordance with the present invention is meant to encompass an opening such as a vehicle window opening. A basic drawback of PIR devices is that the constant motion/ vibration in a vehicle and the movements of the occupants thereof may interfere with the device's usefulness. However, certain measures when taken in combination can alleviate the drawbacks of the prior art. With reference to FIG. 8, the width of the region 242 designated by characters C–E will cause portions of the side panelling of the vehicle to be included in the detection area/region 242. Since these surfaces are warm, for example, from heating inside the vehicle or from the sun, constant false alerts could be generated as the surfaces vibrate during travel.

The drawbacks of the prior art can be avoided by reducing the width C–E, making the detection zone almost planar, through the shaping of the lens and/or by narrowing the window 244.

The length A–B in FIG. 8—which is many feet—also causes constant false alerts due to the inclusion of vibrating/ moving vehicle surfaces such as the front seat and the movement of the front seat occupants. The length of the protected area can be reduced and adjusted through the use—in the sense of control circuitry—of the potentiometer and/or the use of partially opaque (to IR (heat)) materials for the lens or its covering.

The PIR detector can be made more reliable by converting the usual conical shape into a square, which is closer to the shape of a car window and door, by appropriate shaping of the lens and/or multiple sensing elements. This technique, in combination with some/all of the aforementioned techniques, results in an almost "wall" shaped detection area.

False alerts can be further eliminated by adjusting the sensor amplifying circuitry to respond mostly in the 0.3 to 4 hertz frequency range, which is typical of the human body, and/or the use of two or more parallel "walls" and a microprocessor to eliminate repeated vibrations.

Figure 9:
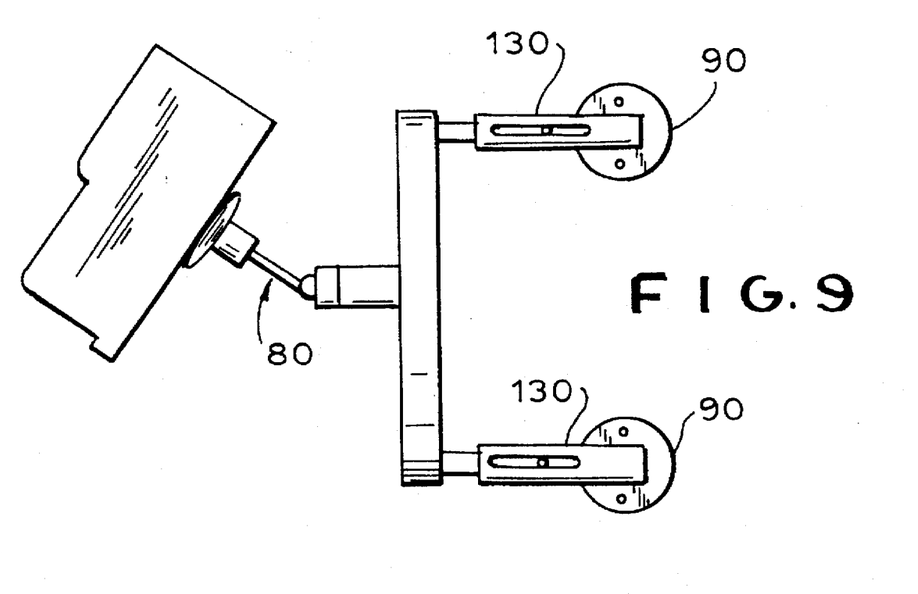
FIG. 9 shows the use of the building blocks of the present invention for supporting an infrared sensing device.

All of the false alert problems can also be eliminated by aiming the PIR detector window 244 at a vehicle surface and mounting the detector—if necessary at an angle—on a surface that vibrates together with the target surface, the detection zone being in between. This method eliminates common mode vibrations, since the detector and the target vibrate in common and eliminates the extra range problems, by cutting one or more of the ranges (A–B, C–D in FIG. 8). This method can be used alone or in combination with the other techniques. The PIR device can be mounted by use of the block connectors of the present invention as shown in FIG. 9. The illustrated PIR holding arrangement permits omni-directional holding and securement of the PIR detector.

If a vehicle transparent surface such as a window is in the detection area, alerts from sources such as incoming headlights can be averted or at least ameliorated by covering that part of the transparent surface with a smoked or darkened film.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An alerting device for a vehicle, the alerting device comprising:
    a sensor for sensing a position of a movable door locking knob of the vehicle, wherein the door locking knob is a manually operable knob located on a door inside the vehicle and is manually operable to lock a door opening handle of the vehicle, the movable locking knob having at least two positions corresponding to an open position and a closed position of the locking knob;

a circuit coupled to the sensor and responsive thereto, the circuit including an alerting element;

the sensor being effective for activating the alerting element when the sensor senses that the locking knob has been moved away from the closed position to alert a driver of the vehicle that the door locking knob has been opened; and the sensor comprising:

a first portion securable to and movable with the door locking knob;

a gripping portion interlinked with and slidable and movable relative to the first portion;

electrical contacts; and the sensor being such that relative movement between the first portion and the gripping portion results in the closing and opening of the electrical contacts.

2. The alerting device of claim 1, in which the circuit is provided in a separate housing and including a electrical wires extending from the sensor to the separate housing.

3. The alerting device of claim 1, in which the circuit is located in a housing abutting the gripping portion.

4. The alerting device of claim 3, including a sleeve around both the first portion and the gripping portion.

5. The alerting device of claim 1, in which the door locking knob is part of the sensor.

6. The alerting device of claim 1, in which the sensor comprises an electrical switch making or breaking a connection, depending on the position of the door locking knob.

7. The alerting device of claim 1, in which the alerting element comprises a buzzer and the circuit includes a power source, and in which the buzzer is activated by said sensor.

8. The alerting device of claim 7, in which the power source is a battery.

9. The alerting device of claim 8, in which the sensor, the buzzer and the battery comprise a closed series circuit.

10. The alerting device of claim 9, in which the closed series circuit also includes a manual switch which allows a user to deactivate the circuit.

11. The alerting device of claim 7, including a volume control for enabling changing an intensity of a signal produced by the alerting element.

12. The alerting device of claim 7, in which the circuit includes a one-shot circuit for creating an output lasting a predetermined duration, in response to and upon each activation by the sensor.

13. The alerting device of claim 7, the circuit including a microprocessor.

14. The alerting device of claim 7, further including means for protecting the alerting device against tampering.

15. The alerting device of claim 1, in which the first element includes means for enabling the same to be connected to a non-removable, substantially rectangularly shaped doorknob.

16. The alerting device of claim 1, in which the first element includes means for connecting the same to a sliding knob style vehicle doorknob.

17. The alerting device of claim 1, in which the first element includes means for connecting the same to a rocker-style vehicle doorknob.

18. A method for alerting a driver of a vehicle, the method comprising the steps of:

providing a sensor for sensing a position of a movable door locking knob of the vehicle, wherein the door locking knob is a manually operable knob located on a door inside the vehicle and is manually operable to lock a door opening handle of the vehicle, the movable door locking knob having at least two positions corresponding to an open position and a closed position of the locking knob;

providing a circuit coupled and responsive to the sensor, the circuit including an alerting element;

activating the alerting element with the sensor when the locking knob has been moved from the closed position to alert a driver of the vehicle that the door locking knob has been opened;

said sensor comprising a first portion securable to and movable with the door locking knob;

a gripping portion interlinked with and movable and slidable relative to the first portion;

electrical contacts; and the sensor being such that relative movement between the first portion and the gripping portion results in the closing and opening of the electrical contacts.

* * * * *